US009674234B2

(12) United States Patent
Ferris et al.

(10) Patent No.: US 9,674,234 B2
(45) Date of Patent: *Jun. 6, 2017

(54) MANAGING AN APPLICATION PROGRAMMING INTERFACE IN A COLLABORATION SPACE

(71) Applicant: Red Hat, Inc., Raleigh, NC (US)

(72) Inventors: James Michael Ferris, Cary, NC (US); David P. Huff, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/453,869

(22) Filed: Aug. 7, 2014

(65) Prior Publication Data
US 2014/0344422 A1 Nov. 20, 2014

Related U.S. Application Data

(63) Continuation of application No. 12/391,730, filed on Feb. 24, 2009, now Pat. No. 8,805,930.

(51) Int. Cl.
H04L 29/02 (2006.01)
H04L 29/06 (2006.01)
G06Q 10/10 (2012.01)

(52) U.S. Cl.
CPC ......... *H04L 65/4015* (2013.01); *G06Q 10/10* (2013.01)

(58) Field of Classification Search
None
See application file for complete search history.

(56) References Cited

U.S. PATENT DOCUMENTS

| 6,195,694 | B1 | 2/2001 | Chen et al. |
| 6,215,495 | B1* | 4/2001 | Grantham ............... G06T 15/00 345/419 |
| 7,162,528 | B1 | 1/2007 | Simonoff et al. |
| 7,467,018 | B1 | 12/2008 | Callaghan |
| 7,668,913 | B1 | 2/2010 | Underwood et al. |

(Continued)

OTHER PUBLICATIONS

Office Action for U.S. Appl. No. 12/391,730 mailed Jan. 7, 2011.
(Continued)

*Primary Examiner* — Hassan Phillips
*Assistant Examiner* — Duc Duong
(74) *Attorney, Agent, or Firm* — Lowenstein Sandler LLP

(57) ABSTRACT

Embodiments relate to systems and methods for managing third-party application programming interfaces in a collaboration space. A collaboration space, such as a wiki site, can host a set of collaboration tools and resources, including, for example, content tools, communication tools, and other resources for the users of the space. The collaboration space can also incorporate and expose a set of application programming interfaces, such as command and data-passing structures to permit users to invoke third-party applications and/or services from within the wiki site or other collaboration space. The set of applications/services be hosted on a remote server or co-hosted on the collaboration server, and can include, for instance, database, spreadsheet, media content, or other applications or services. The invoked applications/services can return data to the requesting user via the collaboration space. Users can subscribe to different applications and/or services available via the collaboration space.

17 Claims, 4 Drawing Sheets

(56) References Cited

U.S. PATENT DOCUMENTS

| | | | |
|---|---|---|---|
| 7,890,333 B2 | 2/2011 | Da Palma et al. | |
| 7,890,487 B1* | 2/2011 | Hess | G06F 17/3056 |
| | | | 707/706 |
| 7,941,399 B2 | 5/2011 | Bailor | |
| 8,074,202 B2 | 12/2011 | Da Palma et al. | |
| 8,140,513 B2* | 3/2012 | Ghods | G06F 9/541 |
| | | | 707/706 |
| 8,578,004 B1 | 11/2013 | Rohrs et al. | |
| 8,805,930 B2* | 8/2014 | Ferris et al. | 709/204 |
| 2002/0174206 A1* | 11/2002 | Moyer | G06F 9/4411 |
| | | | 709/221 |
| 2003/0018719 A1* | 1/2003 | Ruths et al. | 709/205 |
| 2003/0149575 A1* | 8/2003 | Kwan | G06Q 10/10 |
| | | | 705/34 |
| 2004/0068714 A1 | 4/2004 | Deimel et al. | |
| 2005/0138118 A1 | 6/2005 | Banatwala et al. | |
| 2006/0031184 A1 | 2/2006 | Periyaswamy et al. | |
| 2006/0031838 A1 | 2/2006 | Chrabieh | |
| 2006/0242237 A1* | 10/2006 | Manion et al. | 709/204 |
| 2007/0124374 A1* | 5/2007 | Arun et al. | 709/204 |
| 2007/0192715 A1 | 8/2007 | Kataria et al. | |
| 2007/0198534 A1 | 8/2007 | Hon et al. | |
| 2007/0219659 A1 | 9/2007 | Abhyanker et al. | |
| 2007/0294348 A1 | 12/2007 | Cohen et al. | |
| 2008/0010249 A1 | 1/2008 | Curtis et al. | |
| 2008/0010338 A1 | 1/2008 | Curtis et al. | |
| 2008/0059539 A1 | 3/2008 | Chin et al. | |
| 2008/0216056 A1 | 9/2008 | Bate et al. | |
| 2008/0222238 A1* | 9/2008 | Ivanov | H04L 67/16 |
| | | | 709/202 |
| 2008/0270915 A1 | 10/2008 | Tevanian et al. | |
| 2008/0319742 A1 | 12/2008 | Da Palma et al. | |
| 2008/0319762 A1 | 12/2008 | Da Palma et al. | |
| 2008/0320000 A1 | 12/2008 | Gaddam | |
| 2009/0132651 A1* | 5/2009 | Roger et al. | 709/204 |
| 2009/0150910 A1* | 6/2009 | Lyndersay | G06F 9/4843 |
| | | | 719/328 |
| 2009/0259572 A1 | 10/2009 | Lay et al. | |
| 2009/0259945 A1 | 10/2009 | De Spiegeleer | |
| 2010/0107088 A1 | 4/2010 | Hunt et al. | |
| 2010/0115612 A1 | 5/2010 | O'Brien et al. | |
| 2010/0131859 A1 | 5/2010 | Ferris et al. | |
| 2010/0131860 A1 | 5/2010 | DeHaan et al. | |
| 2010/0174789 A1* | 7/2010 | Pena et al. | 709/206 |
| 2010/0218237 A1 | 8/2010 | Ferris et al. | |
| 2010/0305722 A1* | 12/2010 | Jin | H04L 12/2818 |
| | | | 700/90 |
| 2011/0258592 A1* | 10/2011 | Paul et al. | 717/101 |
| 2013/0212485 A1* | 8/2013 | Yankovich | G06F 9/4451 |
| | | | 715/741 |

OTHER PUBLICATIONS

Final Office Action for U.S. Appl. No. 12/391,730 mailed Jun. 28, 2011.
Office Action for U.S. Appl. No. 12/391,730 mailed Oct. 21, 2011.
Final Office Action for U.S. Appl. No. 12/391,730 mailed Mar. 14, 2012.
Office Action for U.S. Appl. No. 12/391,730 mailed Oct. 23, 2012.
Office Action for U.S. Appl. No. 12/391,730 mailed Apr. 22, 2013.
Final Office Action for U.S. Appl. No. 12/391,730 mailed Nov. 29, 2013.
Advisory Action for U.S. Appl. No. 12/391,730 mailed May 25, 2012.
Advisory Action for U.S. Appl. No. 12/391,730 mailed Feb. 20, 2014.
Notice of Allowance for U.S. Appl. No. 12/391,730 mailed Mar. 28, 2014.

* cited by examiner

MANAGING AN APPLICATION PROGRAMMING INTERFACE IN A COLLABORATION SPACE

CROSS-REFERENCE TO RELATED APPLICATION

This application is a continuation of U.S. patent application Ser. No. 12/391,730, filed Feb. 24, 2009, the entirety of which is hereby incorporated herein by reference.

FIELD

The present teachings relate to systems and methods for managing one or more third-party application programming interfaces in a collaboration space, and more particularly to platforms and techniques for deploying and managing wiki sites or other collaboration spaces, in which the space or site is equipped to expose a set of application programming interfaces and other resources to permit users of the space to invoke third-party applications or services.

BACKGROUND

Community collaboration platforms and websites are known which allow members from a public or private community to contribute to or modify content which is shared on the platforms and web sites. One form or type of these platforms and related websites is known as "wikis " In one use, software developers can utilize wikis as a platform for the developers and the community to submit updates, report problems, post fixes, exchange messages and/or the like with the goal to help develop applications and other software or services. Opening up the platform to a community often facilitates the development of the software by providing users a platform to easily and freely submit bug fixes, updates and ideas.

Existing collaboration platforms and software wikis, however, provide no mechanism to allow users to call third party applications or services directly from the wiki site. In other words, software development sites organized as wikis often contain content-management resources to accept source code, comments, email, or other content exchanges. However, those sites do not incorporate programming interfaces to permit contributors to the wiki to invoke third-party databases, messaging tools, or other software or services from within the wiki framework itself. It may be desirable to provide methods and systems for managing a wiki site or other collaboration space which include direct interfacing capabilities to third-party or other applications or services.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Embodiments of the present teachings relate to systems and methods for managing one or more third-party application programming interfaces in a collaboration space. More particularly, embodiments relate to platforms and techniques to support a wiki site or other collaboration space, configured to expose a set of application programming interfaces (APIs) which permit a user to invoke third-party applications or services from within the collaboration space.

In implementations, the collaboration space can in general permit a set of users to access the collaboration space, and upload, access and download content to and from the collaboration space. The content can include, for example, email content or tools, code archive content or tools, instant messaging or other messaging content or tools, calendar or scheduling content or tools, or other content, tools, or resources to help manage the content posted to and maintained by the wiki site or other collaboration space. In embodiments, the collaboration space can be supported by a collaboration server or other host. In embodiments, the collaboration server or other resources used to support the collaboration space can be extracted or maintained in a cloud computing environment.

According to embodiments, the collaboration space can likewise be configured to host or contain a set of application programming interfaces (APIs) to permit a user to invoke or access one or more third-party applications or services, from within the collaboration space. A user who uploads a set of software stress test data can, for instance, invoke or access the application programming interface for a third-party database to transmit that data to a separately hosted instance of that database, to analyze and return reports based on the data shared through that hosted API. In embodiments, the third-party application or service can be hosted in the server supporting the collaboration space itself, or on remote servers.

In implementations, the collaboration space can further be configured to incorporate a set of local executable application resources that can include, for example, available application language or other interpreters, compilers, runtime environments, or other application resources to allow applications to be directly hosted and execute in the collaboration space, itself. In embodiments, the resulting wiki site or other collaboration site or space can be referred to as a "piki" site or space. In embodiments, the set of hosted applications that reside or are instantiated in the collaboration space, can be configured as Web applications. The hosted Web applications can be served to one or more of the set of users, directly from the collaboration space.

Reference will now be made in detail to exemplary embodiments of the present teachings, which are illustrated in the accompanying drawings. Where possible the same reference numbers will be used throughout the drawings to refer to the same or like parts.

Figure 1:
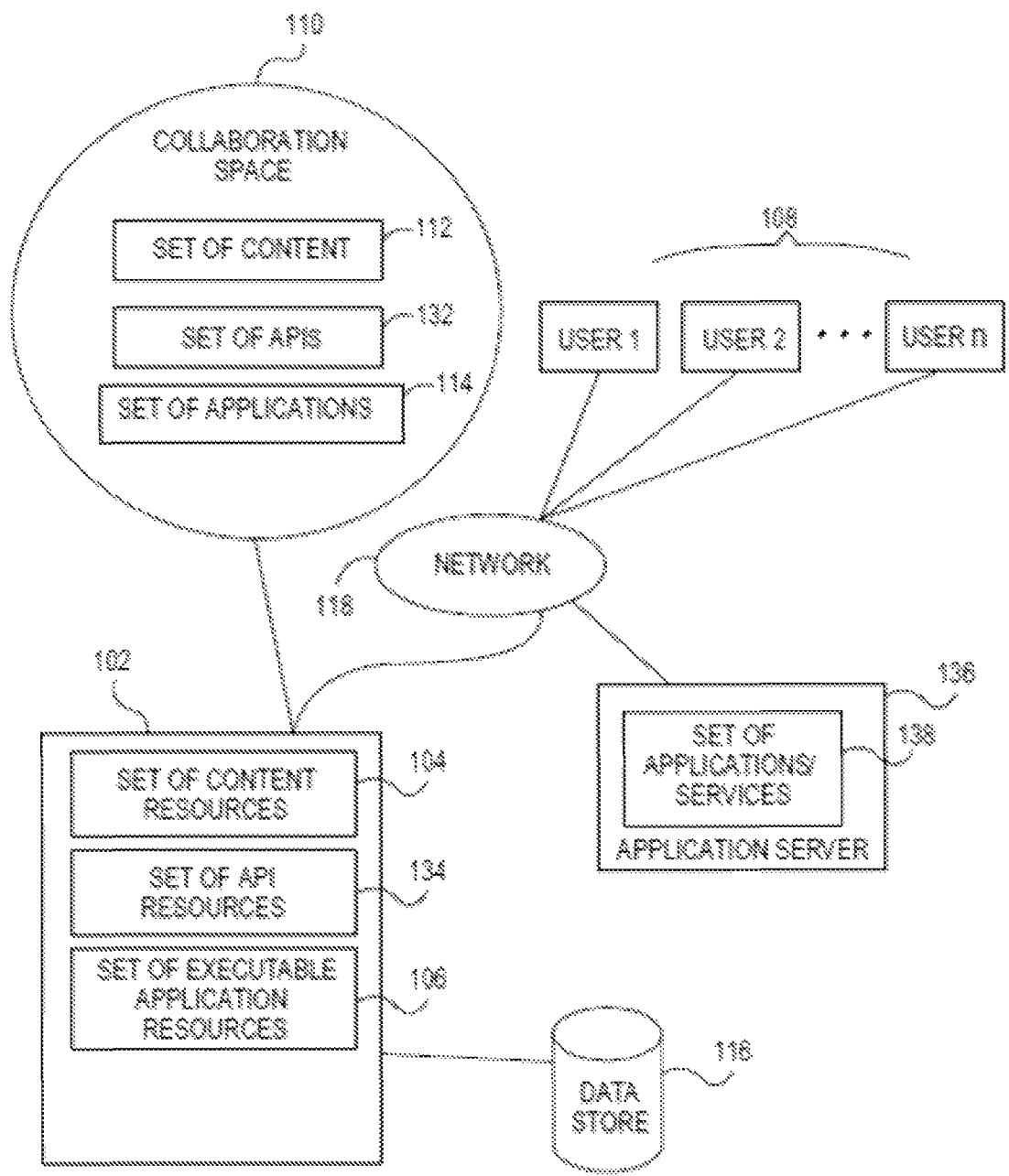
FIG. 1 illustrates an overall system for managing a collaboration space configured to provide third-party or other application programming interface resources, according to various embodiments.

FIG. 1 illustrates an overall system 100 consistent with systems and methods for managing a set of application programming interfaces (APIs) 132 in a collaboration space 110, according to various embodiments of the present teachings. In embodiments as shown, a collaboration space 110 can host or contain a set of content 112, as well as set of APIs 132 and associated resources. In embodiments, the collaboration space 110 can be or include a wiki site, space, or community. In embodiments, collaboration space 110 can host or support resources related to the development of software, such as applications, operating systems, or other software. The set of content 112 can include, for example, email or other messaging content, code storage or archives, blogs, or other media or content.

The collaboration space 110 can be generated or supported by a collaboration server 102. Collaboration server 102 can communicate with a data store 116 to store and manage code, content, applications, APIs, and/or other resources related to collaboration space 110. Collaboration server 102 can likewise comprise a set of content management resources 104, a set of API resources 134, and a set of executable application resources 106. Set of content management resources 104 can comprise software and/or other tools to receive, maintain, and provide access to messaging, code, and other content or media hosted in collaboration space 110. Set of API resources 134 can comprise software and/or other resources or tools to support set of APIs 132 for any one or more third-party applications, tools, services, and/or other resources through which a user in set of users 108 can invoke one or more applications in set of applications/services 138.

Set of API resources 134 can for instance include a library of APIs registered to collaboration space 110 via collaboration server 102. The registered APIs in set of API resources 134 can include for instance definitions of commands, variables, parameters, data types, and/or other specifications to permit a user to pass requests, parameters, and/or other data back and forth to set of applications/services 138. In embodiments, one or more individual applications and/or services in set of applications/services 138 can be hosted in a remote or separate application server 136. In embodiments, one or more individual applications and/or services in set of applications/services 138 can in addition or instead be hosted in collaboration server 102, itself.

According to embodiments, set of users 108 can for instance be entitled to invoke or access individual applications and/or services in set of applications/services based on an authorization or subscription profile. One user in set of users 108 can, for example, maintain a subscription to Web-based database applications or services, along with media download services, entitling that user to access and exchange data with an online data store, and/or download audio or other content. In embodiments, different users can maintain different access privileges for different applications and/or services in set of applications/services 138. In embodiments, some or all users can be provided with common access rights to defined APIs in set of API resources 134.

In implementations, when provided, set of executable application resources 106 can comprise software and/or other tools to maintain, configure, and/or execute or instantiate set of applications 114 or other software within collaboration space 110. Set of executable application resources 106 can comprise, for instance, application language frameworks, compilers or interpreters such as, for example, Python, PERL, Java™, Ruby on Rails, Visual Basic™ available from Microsoft Corp., Struts, or other languages, platforms, and/or other resources. Set of executable application resources 106 can comprise a Web application framework to permit collaboration server 102 to serve applications to one or more users in a set of users 108 via one or more networks 118. One or more networks 118 can be or include the Internet, or other public or private networks. Set of users 108 can include, for instance, anonymous public users, registered or authenticated users, or other users who wish to access collaboration space 110, for example, to participate in the development of applications or other software. The set of applications 114 can include, for example, applications such as software development applications, for instance, debugging tools, performance metric tools, or other applications. In embodiments, set of applications 114 can include applications migrated by users to the collaboration space 110, and can include one or more Web application to be served to requesting users. In embodiments, set of applications 114 can be provided in addition to set of APIs 132. In embodiments, set of APIs 132 can be provided in collaboration space 110 without a separate set of applications 114.

Figure 2:
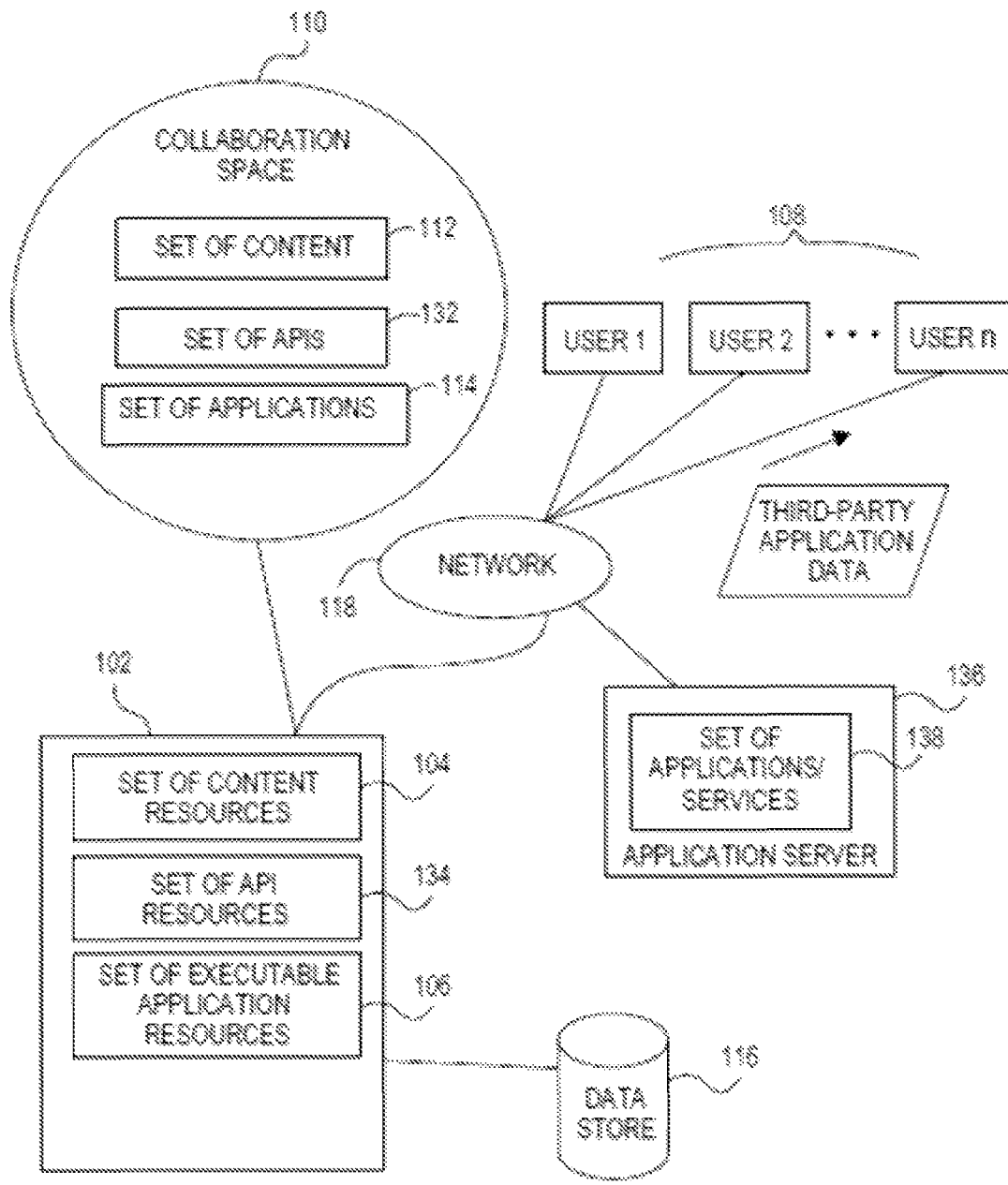
FIG. 2 illustrates an overall system for managing a collaboration space hosting third-party application programming interfaces and other resources, according to various embodiments in further regards.

As shown in FIG. 2, in operation the collaboration space 110 can present a set of content 112, set of APIs 132, and set of applications 114 to any one or more users in the set of users 108 who access the collaboration space 110. In embodiments, one or more applications and/or services in the set of applications/services 138 can be invoked or accessed via the set of APIs 132 presented in collaboration space 110. A user can, for example, transmit a set of digital photographs to collaboration space 110 with a request to store that content to an online photo store. In embodiments, the user can access an underlying application or service in set of applications/services 138 hosted on application server 136 or elsewhere to upload, store, and perform photo correction, printing, or other operations on that content. In embodiments, for further example, the user can invoke an API for a database or spreadsheet application to generate a report on data provided by the user. In embodiments, the reports, data, or other outputs or information generated by set of applications/services 138 can be communicated to the requesting user in the form of third-party application data 140. In embodiments, set of applications/services 138 and associated set of APIs 132 can be configured to accept APIs, applications, services or other resources uploaded by users of collaboration space 110. Other applications, services, and other resources can be invoked via set of APIs 132, and other sets or types of output can be generated and/or exchanged via set of APIs 132.

Figure 3:
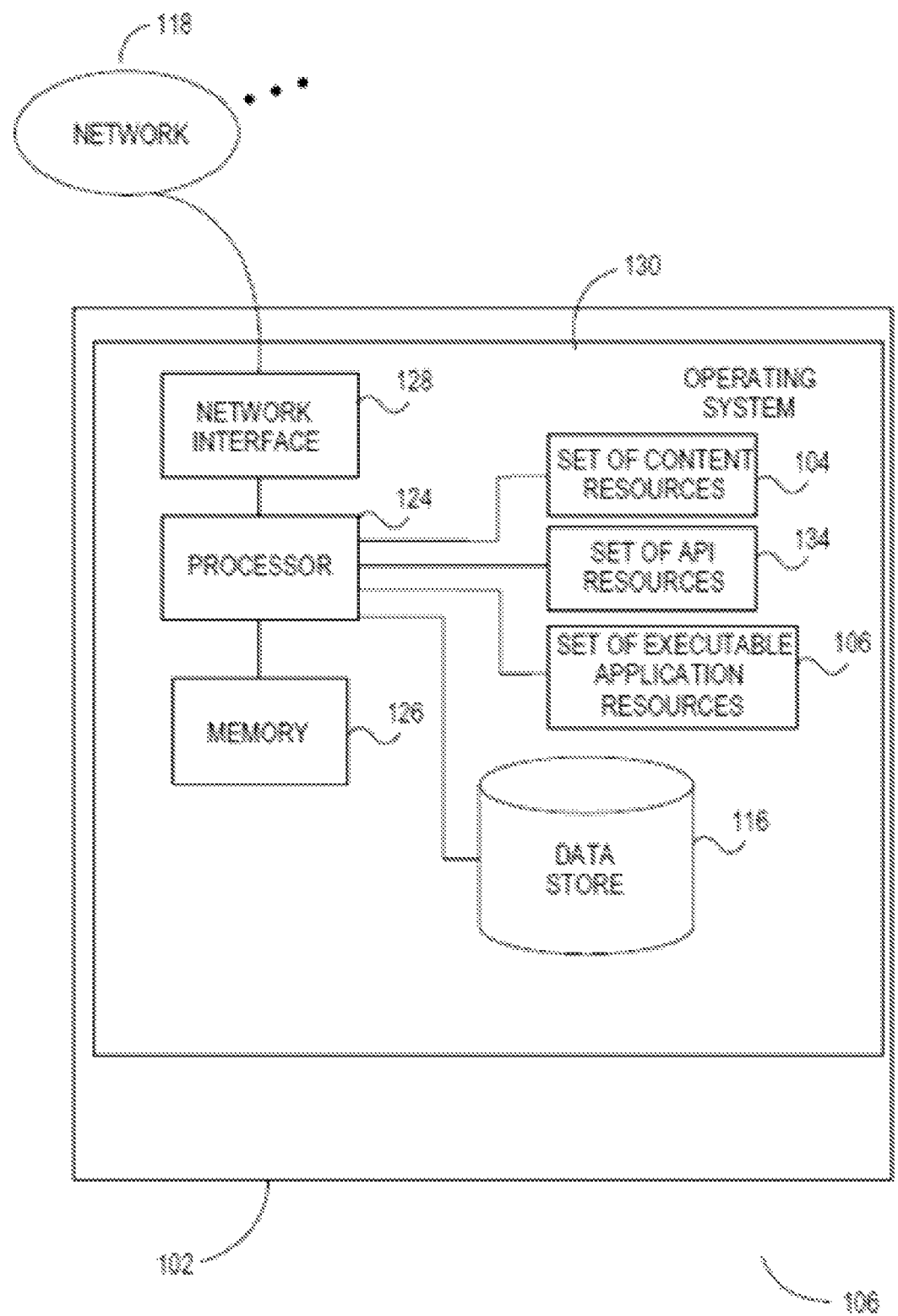
FIG. 3 illustrates an exemplary hardware configuration of a collaboration server that can be used in systems and methods for managing one or more third-party application programming interface in a collaboration, according to various embodiments.

FIG. 3 illustrates an exemplary diagram of hardware and other resources that can be incorporated in collaboration server 102 supporting collaboration space 110, collaboration space 110 in turn being configured to communicate with a set of users 108 via one or more networks 118, according to various embodiments. In embodiments as shown, the collaboration server 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 can also communicate with the data store 116. Processor 124 further communicates with network interface 128, such as an Ethernet or wireless data connection, which in turn communicates with one or more networks 118, such as the Internet or other public or private networks. Processor 124 can also communicate with the memory 126, the network interface 128, and the data store 116 to execute control logic and perform processing to carry out collaboration space management as described herein. Processor 124 can further communicate with set of content management resources 104, and/or set of API resources 134, and/or executable application resources 106 to execute operations in the collaboration space 110. Other configurations of the collaboration server 110, associated network connections, and other hardware and software resources are possible.

Figure 4:
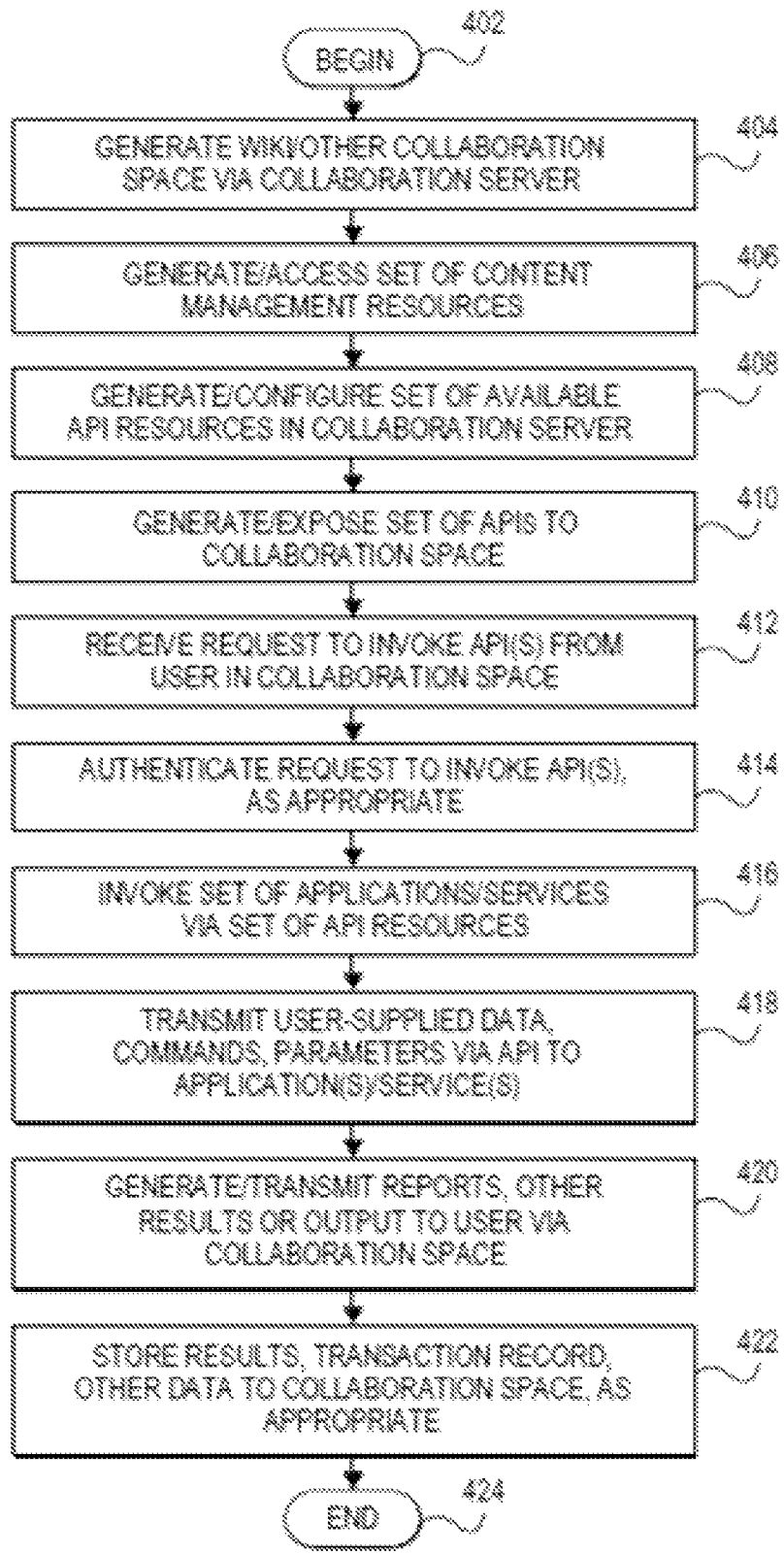
FIG. 4 illustrates a flowchart of overall processing for managing one or more third-party application programming interfaces in a collaboration space, according to various embodiments.

FIG. 4 illustrates overall processing for managing a third-party application programming interface in a collaboration space, according to various to embodiments. In 402, processing can begin. In 404, a collaboration space 110, such as a wiki site, can be generated via collaboration server 102. In 406, the collaboration server 102 can generate and/or access a set of content management resources 104 in the collaboration space 110. In 408, the collaboration server 102 can generate and/or configure an available set of API resources 134, including, for instance, a library, list, or set of links to third-party applications and/or services and associated API calls or definitions. In 410, collaboration server 102 can generate and/or expose set of APIs 132 to collaboration space 110. In 412, collaboration server 102 can receive a request to invoke one or more APIs from a user in set of users 108. In 414, collaboration server 102 can authenticate the user request to invoke one or more API(s), for instance by checking the subscription or validation status of a user to use a third-party application or service.

In 416, the collaboration server 102 can act to invoke the corresponding application and/or service in set of applications/services 138, for instance, by communicating with a remote application server 136 and/or by executing internal applications or services. In 418, user-supplied data, commands, parameters, or other information can be transmitted to the identified application/service via the corresponding API(s) for those resources. In 420, reports, other results or output in the form of third-party application data 140 can be generated and/or transmitted to the requesting user via collaboration space 110 and associated APIs and other resources. In 422, the results, transaction data related to the use of the third-party application/service, and/or other data can be stored to collaboration space 110, as appropriate. In 424, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which one collaboration server supports a collaboration space and the set of users who participate in that space, in embodiments multiple servers or hosts can support the wiki site or other collaboration environment. Similarly, while embodiments have been described in which one collaboration host supports one collaboration space, in embodiments, one or more collaboration servers can support multiple wiki sites or other collaboration spaces. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   providing, by a processor, a collaboration space to a plurality of users;
   hosting a plurality of application programming interfaces in the collaboration space, wherein the plurality of application programming interfaces permit the plurality of users to invoke a plurality of different web applications via the collaboration space, and wherein each of the plurality of application programming interfaces comprise a library of commands associated with at least one of the plurality of different web applications;
   invoking, by the processor, a selected web application of the plurality of different web applications from within the collaboration space via an application programming interface among the plurality of application programming interfaces; and
   executing the selected web application in the collaboration space on behalf of a user in view of a subscription associated with the user.

2. The method of claim 1, wherein the collaboration space comprises a wiki site.

3. The method of claim 1, wherein the library of commands comprises at least one specifier for an exchanged parameter.

4. The method of claim 1, wherein the at least one of the plurality of different web applications is hosted on an application server.

5. The method of claim 1, wherein the at least one of the plurality of different web applications is hosted on a server hosting the collaboration space.

6. The method of claim 1, further comprising authenticating a user request to invoke at least one of the different web applications.

7. A system comprising:
   a memory to store instructions; and
   a processor operatively coupled to the memory, the processor to execute the instructions to:
   provide a collaboration space, using the processor, to a plurality of users;
   host a plurality of application programming interfaces in the collaboration space,
   wherein the plurality of application programming interfaces permit the plurality of users to invoke a plurality of different web applications via the collaboration space, and
   wherein each of the plurality of application programming interfaces comprise a library of commands associated with at least one of the plurality of different web applications;
   invoke a selected web application of the plurality of different web applications from within the collaboration space via an application programming interface among the plurality of application programming interfaces; and
   execute the selected web application in the collaboration space on behalf of a user in view of a subscription associated with the user.

8. The system of claim 7, wherein the collaboration space comprises a wiki site.

9. The system of claim 7, wherein the library of commands comprises at least one specifier for an exchanged parameter.

10. The system of claim 7, wherein the at least one of the plurality of different web applications is hosted on an application server.

11. The system of claim 7, wherein the at least one of the plurality of different web applications is hosted on a server hosting the collaboration space.

12. The system of claim 7, further comprising authenticating a user request to invoke at least one of the different web applications.

13. A non-transitory computer-readable storage medium, the non-transitory computer-readable storage medium comprising instructions that, when executed by a processor, cause the processor to:

provide a collaboration space, using the processor, to a plurality of users;

host a plurality of application programming interfaces in the collaboration space, wherein the plurality of application programming interfaces permit the plurality of users to invoke a plurality of different web applications via the collaboration space, and wherein each of the plurality of application programming interfaces comprise a library of commands associated with at least one of the plurality of different web applications;

invoke a selected web application of the plurality of different web applications from within the collaboration space via an application programming interface among the plurality of application programming interfaces; and execute the selected web application in the collaboration space on behalf of a user in view of a subscription associated with the user.

14. The non-transitory computer-readable storage medium of claim 13, wherein the collaboration space comprises a wiki site.

15. The non-transitory computer-readable storage medium of claim 13, wherein the library of commands comprises at least one specifier for an exchanged parameter.

16. The non-transitory computer-readable storage medium of claim 13, wherein the at least one of the plurality of different web applications is hosted on an application server.

17. The non-transitory computer-readable storage medium of claim 13, wherein the at least one of the plurality of different web applications is hosted on a server hosting the collaboration space.

\* \* \* \* \*